United States Patent
Mujtaba et al.

(10) Patent No.: US 8,392,150 B2
(45) Date of Patent: Mar. 5, 2013

(54) SMART CONTENT AND PLACEMENT IN A COMPUTER-AIDED DESIGN APPLICATION

(75) Inventors: Shelly Mujtaba, Chicago, IL (US); Anup Chatterjee, Fremont, CA (US); Kirill Goldin, Burlingame, CA (US); Michael B. Haley, San Rafael, CA (US)

(73) Assignee: Autodesk, Inc., San Rafael, CA (US)

( * ) Notice: Subject to any disclaimer, the term of this patent is extended or adjusted under 35 U.S.C. 154(b) by 306 days.

(21) Appl. No.: 12/606,678

(22) Filed: Oct. 27, 2009

(65) Prior Publication Data

US 2010/0145665 A1    Jun. 10, 2010

Related U.S. Application Data

(60) Provisional application No. 61/120,241, filed on Dec. 5, 2008.

(51) Int. Cl.
*G06F 17/50* (2006.01)
(52) U.S. Cl. .......................................... 703/1
(58) Field of Classification Search ........................ 703/1
See application file for complete search history.

(56) References Cited

PUBLICATIONS

Ken Xu "Automatic Object Layout Using 2D Constraints and Semantics" 2001 University of Toronto.*
RDF Primer, W3C Recommendation Feb. 10, 2004, http://www.w3.org/TR/2004/REC-rdf-primer-20040210, accessed Nov. 6, 2008.
Aish, R., "Bentley's GenerativeComponents, a design tool for exploratory architecture," 2003.
Coenders, J., "Interfacing parametric associative and structural software," YM Xie & I Patnaikuni (Eds.), Innovations in structural engineering and construction (pp. 63-68). London, UK: Taylor & Francis.

* cited by examiner

*Primary Examiner* — Saif Alhija
(74) *Attorney, Agent, or Firm* — Gates & Cooper LLP (57) ABSTRACT

A method, apparatus, and article of manufacture provide the ability to manipulate a graphical representation of a real-world object in a computer drawing application. A semantic behavior is defined for the real-world object. A graphical representation of the real-world object (referred to as a subject object) is obtained. The semantic behavior is assigned to the subject object. The subject object is placed into a drawing. When placed, the subject object automatically, without additional user input, places itself into the drawing based on the semantic behavior.

20 Claims, 3 Drawing Sheets

| Content Type | Sub Type | Collision | Attachment | Affinity | Orientation | Notes |
|---|---|---|---|---|---|---|
| Flooring | Floor Tile | N | N | N | N | Area attachment |
|  | Carpet | N | N | N | N | Area attachment |
|  | Wood | N | N | N | N | Area attachment |
|  | Rugs | Y | N | Y |  | Wall Collision, floor affinity |
| Seating | Chairs | Y | N | Y | Wall | Floor affinity |
|  | Sofas | Y | N | Y | Wall | Floor affinity, attachment to "related sofa" (e.g. - sectional) |
| Surface | Table | Y | Y | Y | N | Floor affinity, attach to other tables |
| Storage | Countertop | Y | Y | N | Wall | Attach to other tables, walls, floor cabinets |
|  | Cabinets-Floor | Y | Y | Y | Wall | Floor affinity, wall attach, attach to other floor cabinets |
|  | Cabinets-Wall | Y | Y | N | Wall | Wall attach, attach to other wall cabinets |
|  | Closets-Wall | Y | N | N | Wall | Wall attach, attach to other closet cabinets |
|  | Desk | Y | N | Y | Wall | Floor affinity / Wall facing |
|  | Free standing cabinets, dresser or shelving | Y | Y | Y | Wall | Floor affinity/Wall facing/attach to other cabinets / shelving |
| Lighting | Floor lamps | Y | N | Y |  | Floor |
|  | Table lamps | Y | N | Y |  | Surface, FS cabinet / shelving, desk affinity |
|  | Wall lighting fixtures | Y | Y | N |  | Wall attach |
|  | Ceiling lighting fixtures | Y | Y | N |  | Ceiling attach |
| Decorative | Wall hangings | Y | Y | N |  | Wall attach |
|  | Pillows | ? | N | Y |  | Seating, Surface, Flooring, Desk, FS Cabinet /shelving affinity |
|  | Decorative items (free standing plants, vases, clocks knick-knacks etc) | Y | N | Y |  | Floor, surface, Desk, FS Cabinet / shelving affinity |
| Electronics | Stereo, TV | Y | N | Y | Wall | Floor, Surface, Desk, Freestanding cabinets / shelving |
|  | Computer | Y | N | Y |  | Surface, Desk, FS cabinets, dresser, or shelving |
| Architectural | Fireplace | Y | Y | Y |  | Floor affinity/wall attach |
|  | Column | Y | N | Y |  | Floor affinity |
| Openings | Doors | Y | Y | Y | Wall | Floor affinity/wall attach |
|  | Windows | Y | Y | N | Wall | Wall attach |
| Sleeping | Bed | Y | N | Y | Wall | Floor affinity |
| Plumbing | Sink | ? | Y | Y |  | Countertop / Floor cabinets |
|  | Toilet | Y | Y | Y | Wall | Floor attach, wall alignment |
|  | Shower | Y | Y | Y |  | Floor attach, wall alignment |
|  | Bathtub | Y | N | Y |  | Floor attach, wall alignment |
|  | Faucet | ? | Y | ? |  | Sink attach |

FIG. 3

SMART CONTENT AND PLACEMENT IN A COMPUTER-AIDED DESIGN APPLICATION

BACKGROUND OF THE INVENTION

1. Field of the Invention

The present invention relates generally to computer-implemented drawing applications, and in particular, to a method, apparatus, and article of manufacture for placing and utilizing objects and content in a computer-implemented drawing program based on semantics and behavioral attributes.

2. Description of the Related Art

For computer-aided design (CAD) applications (e.g., home remodeling/interior design applications), adding content to a floor plan, layout, elevation or other large design project can be problematic. Such content addition often involves an external reference, importing, scaling, positioning and manually moving the object until the position is right. Often the object being added to a scene, whether it's a window, or a chair is usually closely associated with other objects already present in the scene. If objects had some kind of pre-determined intelligence with respect to other objects in a scene, placement, scale and position could be done automatically. Accordingly, there exists a need for some intelligence associated with objects and to a certain extent blocks in a scene. These problems may be better understood with a description of prior art object placement and existing mechanisms for defining and creating user interfaces.

An example of the addition of an object in a CAD environment is that of a user creating a simple office layout. Once the basic floor plan is complete, the user may desire to add a door, desk, chair, bookcase and computer to the scene. To add such objects, the user must perform the following series of steps:

(a) User locates a desk and imports it;
(b) User positions desk correctly in the scene (provided the user can view it once imported);
(c) User scales desk correctly for the proportions of the office space;
(d) User imports a chair;
(e) User positions the chair according to the desk position; etc.
(f) User scales the chair accordingly;
. . . (g) etc. with other objects.

As described above, if the objects have some kind of pre-determined intelligence with respect to other objects, placement, scale and position could be performed automatically. In the above example, if the desk had intelligence that it should be adjacent a wall or the proper scale value, the user would not need to manually position or scale the desk. Similarly, if the chair had pre-determined knowledge regarding placement based on the desk position and the size of the chair (via scaling), the user would not have to perform the manual steps recited above.

In another example, if window added to a scene knew that it had to be within a relative proximity to a desk and knew what scale it was to be when imported, considerable time could be saved during normal workflow. Similarly, if a chair had some intelligence about a scene and knew that it had to have a desk within a certain proximity, orientation and scale, considerable time would be saved in these operations.

Accordingly, there is a need for some intelligence in objects when they are added to a scene. Further, there is a need for a user to be able to create and use such intelligence in an efficient and understandable manner.

In addition to the above, the user must have the ability to easily understand and work with such intelligence both on a specific computer and across a network. Prior art methodologies exist that attempt to represent information about resources on the Internet in an easily understandable language. For example, the Resource Description Framework (RDF™) available from the W3C™ organization. RDF™ is a language hat represents metadata about Web resources, such as the title, author, and modification date of a Web page, copyright and licensing information about a Web document, or the availability for some shared research. In addition, RDF™ can be used to represent information about things that can be identified on the Web, even when they cannot be directly retrieved on the Web (e.g., information about items available from on-line shopping facilities or the description of a Web user's preferences for information delivery.

Semantic Web™ is an extension of the Internet in which the semantics of information and services on the web is defined, making it possible for the web to understand and satisfy the requests of people and machines to use web content. Elements of Semantic Web™ are expressed in formal specifications including RDF™.

In view of the above, Semantic Web™ and RDF™ may be used to assist a user in defining and utilizing web content by establishing objects and relationships between such objects that are based on a semantic document. However, the ability to describe and utilize semantics to create and define a user interface that can be used to place objects in a computer aided drawing in an intelligent manner is lacking from the prior art.

SUMMARY OF THE INVENTION

In the prior art, objects were often placed into a scene manually by a user, which made the entire object placement process very slow and frequently required professional assistance. Further, prior art web-based design applications do not have any intelligence component and rely on manual placement and user experience. Other prior art applications lack flexibility and require professional knowledge and training in order to create a design of reasonable complexity.

One or more embodiments of the invention provide the idea for an object placing itself intelligently, based on rules and behavior. Such intelligence provides both an attribute of an object and may further be acquired knowledge based on analysis of user behavior patterns and relationships between objects. Accordingly, as content of the system is more widely used, the usability of the system improves automatically (i.e., without additional user input and dynamically in real-time) without changing or upgrading software.

BRIEF DESCRIPTION OF THE DRAWINGS

Referring now to the drawings in which like reference numbers represent corresponding parts throughout:

FIG. 2 illustrates examples of the different types of content that may be available in accordance with one or more embodiments of the invention.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
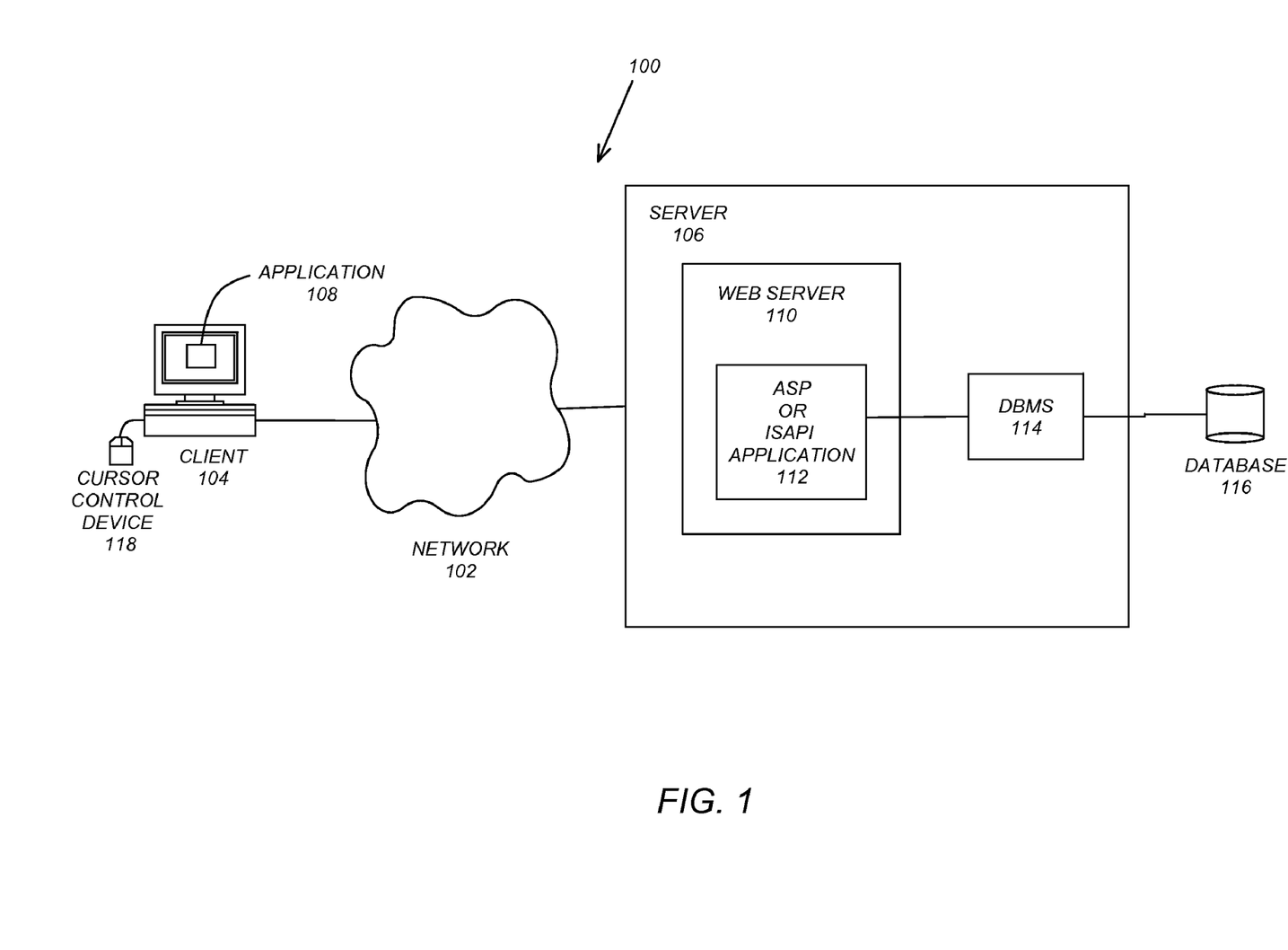
FIG. 1 schematically illustrates a hardware and software environment in accordance with one or more embodiments of the invention.

FIG. 1 schematically illustrates a hardware and software environment in accordance with one or more embodiments of the invention, and more particularly, illustrates a typical distributed computer system 100 using a network 102 to connect client computers 104 to server computers 106. A typical combination of resources may include a network 102 comprising the Internet, local area networks (LANs), wide area networks (WANs), system network architecture (SNA) networks, or the like, clients 104 that are personal computers or workstations, and servers 106 that are personal computers, workstations, minicomputers, or mainframes. Additionally, both client 104 and server 106 may receive input (e.g., cursor location input) and display a cursor in response to an input device such as cursor control device 118.

A network 102 such as the Internet connects clients 104 to server computers 106. Additionally, network 102 may utilize radio frequency (RF) to connect and provide the communication between clients 104 and servers 106. Clients 104 may execute a client application 108 or Web browser 108 and communicate with server computers 106 executing Web servers 110. Further, the software executing on clients 104 may be downloaded from server computer 106 to client computers 104 and installed as a plug in or ActiveX control of a Web browser. Accordingly, clients 104 may utilize ActiveX components/component object model (COM) or distributed COM (DCOM) components to provide a user interface on a display of client 104. The Web server 110 is typically a program such as Microsoft's Internet Information Server™.

Web server 110 may host an Active Server Page (ASP) or Internet Server Application Programming Interface (ISAPI) application 112, which may be executing scripts. The scripts invoke objects that execute business logic (referred to as business objects). The business objects then manipulate data in database 116 through a database management system (DBMS) 114. Alternatively, database 116 may be part of or connected directly to client 104 instead of communicating/obtaining the information from database 116 across network 102. When a developer encapsulates the business functionality into objects, the system may be referred to as a component object model (COM) system. Accordingly, the scripts executing on web server 110 (and/or application 112) invoke COM objects that implement the business logic. Further, server 106 may utilize Microsoft's Transaction Server (MTS)™ to access required data stored in database 116 via an interface such as ADO (Active Data Objects), OLE DB (Object Linking and Embedding DataBase), or ODBC (Open DataBase Connectivity).

Generally, these components 108-118 all comprise logic and/or data that is embodied in or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.

Software Embodiments

One or more embodiments of the invention provide a computer program 108 that establishes a system where both the order/procedure for building a graphical user interface as well as a behavior for moving and placing objects within the graphical user interface are driven semantically. Thus, embodiments have both semantic and related behavioral aspects that server to create a flexible framework for manipulating objects in an efficient and easily understandable manner.

In view of the above, one or more embodiments of the program 108 may consist of a computer drawing application that allows users to move and manipulate objects within a scene. The computer drawing application may be a computer-aided design (CAD) application, a three-dimensional modeling application, a two-dimensional drawing application, etc. Objects that appear within program 108 have a behavior assigned to it according to a classification/semantics. The semantics may be used not just to identify what behavior is being used, but also to describe the actual rules/definitions for creating/using the object within a user interface. To better understand the invention, a description of content and types of semantics that may be used with such content is useful.

To provide a particular behavior for content, the content should have intelligence and one or more constraints. The complexity of intelligence as well as level of sophistication for constrains is practically unlimited in real life. Accordingly embodiments enable an extendable system, wherein desirable behavior can be described by a content provider with practically infinite complexity. For example, for home improvement/interior design products, all windows behave in a similar way, yet some of the windows may have more intelligent behavior where size and placement can be determined based on sun location, time of the year, or some aesthetic criteria.

In another example, door placement can be automatically based on other doors and windows in close proximity and possibly on other objects present in a particular scene. In yet another example, chairs, stools, tables, desks, and similar objects may all have some intelligence that would guide their placement relative to each other in a particular scene. Chairs would know that they ideally would appear in a certain orientation relative to a desk and their scale would have to be the same as the desk.

A particular behavior may be established for a given object by assigning a classification or semantic (e.g., label) to an object. Such a semantic may provide a behavior based on various basic rules. The basic rules provide for the following types of behaviors: (1) collision; (2) orientation; (3) affinity; and (4) attachment. These behaviors may be assigned to a subject (the object on which the rules are being evaluated) or to a host (the object to which the subject will attach). Further, different types of content may be used in the various rules.

FIG. 2 illustrates examples of the different types of content that may be available in accordance with one or more embodiments of the invention. As illustrated, content types may include flooring, seating, surface, storage, lighting, decorative, electronics, architectural, openings, sleeping, and plumbing. Further, each of the different content types may be sub types. For example, flooring may be floor tile, carpet, wood, or rugs. Different behavioral rules may be applied to all objects of a particular content type based on the information in FIG. 2. For example, flooring may be an area attachment but does not have any inherent collision, attachment, affinity, or orientation based behaviors. However, seating may have collision behavior, no attachment based behavior, floor affinity, and a wall based orientation. In this regard, as can be seen by the comments, the sofa seating may also have an attachment to a related sofa such as a sectional but no generic attachment properties. As can be seen, users or manufacturers may easily add to this table in a dynamic manner to further specify different semantics that objects may be classified with/into.

With the various behavioral rules specified above, it may be useful to describe how each type of behavior operates.

The collision behavior provides for an intersection between geometries and/or bounding boxes of two objects. Table A illustrates the schema for the collision behavior in accordance with one or more embodiments of the invention.

TABLE A

Collision

| Attribute | Description | Required |
|---|---|---|
| host-type | Host content type or ALL | Yes if no host-id |
| host-id | ID of a specific host | Yes if no host-type |
| exclusion-host-id | If a host-type is specified but this particular host should be excluded from rule execution | No |

Comments: One of host-type or ID needs to be specified, if both are specified, host-id will be ignored In Table A, the host-type field specifies which types of host objects the subject object can interfere with. For example, the host-type may be seating, surface, lighting, etc. The host-id allows the specification of a particular host id to use within a behavioral definition. The exclusion-host-id allows provides the ability to exclude the application of the behavior to the specifically identified host (i.e., identified by the host id). An example of code that may be used for a default décor item having a collision behavior may be:

```
<Collision>
    <!--Sample behavior for a decorative item. The item exhibits
    Collision behavior - it collides with all objects of type surface except
    the exclusion host id object -->
    <inclusionHost hostType="SURFACE"/>
    <exclusionHost hostID="OverRideMe"/>
</Collision>
```

Such extensible markup language (XML) code specifies the sample behavior where it may collide with all objects of type SURFACE except for the specific hosts having a hostID of "OverRideMe".

The orientation behavior provides for a loose alignment of one item to the geometry of another item. For example, a sofa may have a back facing orientation with respect to a wall. Table B illustrates the schema for the orientation behavior in accordance with one or more embodiments of the invention.

TABLE B

Orientation

| Attribute | Description | Required |
|---|---|---|
| host-type | Host content type | Yes if no host-id |
| host-id | ID of a specific host | Yes if no host-type |
| exclusion-host-id | If a host-type is specified but this particular host should be excluded from rule execution | No |
| host-location | CENTER\|FRONT\|BACK\|LEFT\|RIGHT | No, only required if the subject needs to be aligned to a specific section of the host geometry |
| subject-location | CENTER\|FRONT\|BACK\|LEFT\|RIGHT | Yes |
| snap-distance | Distance at which this rule should execute, if not specified a default value would be used | No |

Comments: One of host-type or ID needs to be specified, if both are specified, host-id will be ignored In Table B, the host-type, host-id, and exclusion-host-id identify the host information for the orientation behavior similar to that of the collision behavior. The host-location specifies the specific sections of the host geometry that the subject is to be aligned with. Such locations include center, front, back, left, and right. Similarly, the subject-location attribute specifies they locations of the subject that will be aligned with the host. Such locations include center, front, back, left, and right. Lastly, the snap-distance attribute specifies a particular distance at which the orientation rule will execute. In other words, if a distance is specified, when a subject is placed within the snap-distance, the subject will be oriented based on the remainder of settings within the rule.

An example of code that may be used for a default décor item having an orientation behavior may be:

```
<Orientation>
    <!-- Sample behavior for a sofa - The item exhibits orientation with
    walls, aligns its back to the front of the wall -->
    <inclusionHost executionDistance="10" hostType="WALLS"
    subjectLocation="BACK" hostLocation="FRONT"/>
</Orientation>
```

In this example, the orientation of a sofa is provided with respect to walls. Namely, when the sofa is paced within a snap distance (i.e., execution distance) of 10 of a wall, the back of the sofa is aligned with the front of the wall.

The affinity behavior provides placement rules that define where an object can be legally placed. Affinity is stronger (i.e., has priority or higher precedence within a hierarchical application of behaviors) than orientation rules. Table C illustrates the schema for the affinity behavior in accordance with one or more embodiments of the invention.

TABLE C

Affinity

| Attribute | Description | Required |
|---|---|---|
| host-type | Host content type | Yes if no host-id |
| host-id | ID of a specific host | Yes if no host-type |
| exclusion-host-id | If a host-type is specified but this particular host should be excluded from rule execution | No |

TABLE C-continued

Affinity

| Attribute | Description | Required |
|---|---|---|
| host-location | CENTER\|FRONT\|BACK\|LEFT\|RIGHT\|TOP\|BOTTOM\|<specific-point> | Yes |
| subject-location | CENTER\|FRONT\|BACK\|LEFT\|RIGHT\|TOP\|BOTTOM\|<specific-point> | Yes |
| snap-distance | Distance at which this rule should execute, if not specified a default value would be used | No |

Comments: One of host-type or ID needs to be specified, if both are specified, host-id will be ignored In Table C, the host-type, host-id and exclusion-host-id attributes are used in similar manner to that for the collision and orientation behaviors. The host location specifies the specific reference point (i.e., center, front, back, left, right, top, or bottom) of the host that determines where that the subject can be legally placed.

Similarly, the subject-location specifies the specific reference point (i.e., center, front, back, left, right, top, or bottom) of the subject for determining where the subject can be legally placed. The snap-distance attribute specifies a particular distance at which the affinity rule will execute. In other words, if a distance is specified, when a subject is placed within the snap-distance, the subject will have an affinity based on the remainder of settings within the rule.

An example of code that may be used for a default décor item having an affinity behavior may be:

```
<Affinity>
    <!--Sample behavior for a decorative item. The item exhibits affinity
behavior - it builds affinity with all Surface and Seating types except for
the hostID of OverRideMe -->
    <inclusionHost hostType="SURFACE"/>
    <inclusionHost hostType="SEATING"/>
    <exclusionHost hostID="OverRideMe"/>
</Affinity>
```

Such XML text defines the affinity behavior for a decorative item subject that may be legally placed on the surface or seating of any host except if the host has a hostID of OverRideMe.

The attachment behavior provides the ability to attach two objects such that both a host and visitor object move if either the visitor or host object is moved. The attachment behavior is stronger (i.e., has priority or higher precedence within a hierarchical application of behaviors) than the affinity and orientation behaviors.

Table D illustrates the schema for the attachment behavior in accordance with one or more embodiments of the invention.

TABLE D

Attachment

| Attribute | Description | Required |
|---|---|---|
| host-type | Host content type | Yes if no host-id |
| host-id | ID of a specific host | Yes if no host-type |
| exclusion-host-id | If a host-type is specified but this particular host should be excluded from rule execution | No |

TABLE D-continued

Attachment

| Attribute | Description | Required |
|---|---|---|
| host-location | CENTER\|FRONT\|BACK\|LEFT\|RIGHT\|TOP\|BOTTOM\|<specific-point> | Yes |
| subject-location | CENTER\|FRONT\|BACK\|LEFT\|RIGHT\|TOP\|BOTTOM\|<specific-point> | Yes |
| snap-distance | Distance at which this rule should execute, if not specified a default value would be used | No |

Comments: One of host-type or ID needs to be specified, if both are specified, host-id will be ignored The host-type, host-id, and exclusion-host-id attributes provide similar conditions to that of the other behaviors. The host-location and subject location specify the specific points (center, front, back, left, right, top, or bottom) of the host and subject where the host may attach to the subject. The snap-distance attribute specifies a particular distance at which the attachment rule will execute. In other words, if a distance is specified, when a subject is placed within the snap-distance, the subject will be attached based on the remainder of settings within the rule.

An example of code that may be used for a default décor item having an attachment behavior may be:

```
<Attachment>
    <!-- Sample behavior for a rug type item which attaches to all
flooring types - it attaches with all FLOORING types, and it also attaches
at a negative point with OverRideMe -->
    <inclusionHost executionDistance="-10" hostID="OverRideMe"
subjectLocation="FRONT" hostLocation="BACK"/>
    <inclusionHost hostType="FLOORING"/>
</Attachment>
```

In the above XML language for the attachment behavior, the front of a rug subject is attached to the back of any flooring. In addition, the rug may also attach to any host having a host id of override me when placed within a distance of −10.

Attachment and affinity behaviors (as well as orientation behaviors) may be geometrically or non-geometrically based. For geometric based attachments/affinity, one object attaches its generic geometry location to the host. Examples of geometry based attachments include center line (a line running along the center of the object aligns to a line running along the center of the host) and front/left/back/right (a line running along the front/left/back/right of the object aligns with a different line on the host). For non-geometry based attachments/affinity, a specific point (x,y,z) on the object can be attached to the host (also referred to as a point to point where both the subject and host specify points for attachment/affinity).

An additional behavior may include a magnetism behavior that identifies a behavior that a subject indicates as it moves closer to a host (e.g., automatically adjusting to a certain distance/tolerance once it approached a defined area of influence of the host object). Similarly, a snapping behavior may identify whether an object snaps to a particular angle (e.g., 45 degrees) (e.g., door orientation, tables, chairs, sofas, etc.).

In view of the above defined behaviors, a hierarchy for execution of the rules may be established which specifies which rules have higher priority or will execute or override a behavioral rule (if a conflict arises). An exemplary hierarchy may be orientation, affinity, attachment, collision. In such a hierarchy, orientation based behavior would execute before affinity rules, which would execute before attachment rules, which would execute before collision rules.

The above XML based examples for the different behaviors, provide the behavior for any décor item (e.g., free standing vase or pillow). Any décor item can reference the above XML language (which can be combined into a single XML file) and/or partially or completely override it and/or reference any combination of rule files—in this case they will be merged together for interpretation. As can be clearly seen, the semantics for the different categories are being used not just to identify what behavior is being used, but also to describe the actual rules. The rules and definitions for the rules may be extended indefinitely and include very complex behaviors (including scripted behaviors).

The examples below illustrate additional behavioral rules that are defined semantically. The first example provides an XML document that defines a sample behavior for a wall cabinet.

```
<?xml version="1.0" encoding="UTF-8"?>
<Behavior>
  <!--Sample behavior for a wall cabinet-, the cabinet attaches to both
  the wall and other storage objects, the cabinet collides with the other
  cabinets if none of the attachment conditions are satisfied. Finally the
  object collides against a specific type of object-->
    <Collision host-type='Storage'/>
    <Collision host-id='ae124ss'/>
    <Attachment host-type='Wall' host-location='CENTER'
subject-location='BACK'/>
    <Attachment host-type='Storage' host-location='LEFT' subject-
location='RIGHT'/>
    <Attachment host-type='Storage' host-location='RIGHT'
subject-location='LEFT'/>
</Behavior>
```

In the example, the back of the wall cabinet attaches to center of the wall. In addition, the right and left sides of the wall cabinet attach to other storage objects. The wall cabinet also collides with a storage type object.

The next example semantically defines a sample behavior for a furniture seating:

```
<?xml version="1.0" encoding="UTF-8"?>
<Behavior>
  <!--Sample behavior for a furniture seating- The item orients with its
  back aligned to the center line of the wall. It collides with the wall and
  other items of content type furniture-seating-->
    <Collision host-type='Wall'/>
    <Collision host-type='Furniture-Seating'/>
    <Orientation host-type='Wall' host-location='CENTER'
subject-location='BACK'/>
</Behavior>
```

In this example, the furniture seating collides with walls or other furniture type seating and is oriented with the back of the furniture at the center of the wall.

The following example illustrates the sample behavior for a decorative item:

```
<?xml version="1.0" encoding="UTF-8"?>
<Behavior>
  <!--Sample behavior for a decorative item- The item exhibits
affinity with surface type furniture. It collides with the wall and other
items of content type furniture-seating-->
    <Collision host-type='Wall'/>
    <Collision host-type='Decorative'/>
    <Collision host-type='Furniture-seating'/>
    <Collision host-type='Storage'/>
    <Affinity host-type='Furniture-surface' host-
location='CENTER' subject-location='CENTER'/>
    <Affinity host-type='Floor' host-location='FRONT' subject-
location='CENTER'/>
</Behavior>
```

The above example provides that the decorative item collides with walls, other decorative items, furniture seating or storage. Further, the decorative item can be placed (based on the affinity rules) based on the center of the decorative item and center of the furniture it is being placed on OR based on the center of the decorative item and the front of the floor.

The last example below illustrates the sample semantically defined behavior for a fireplace:

```
<?xml version="1.0" encoding="UTF-8"?>
<Behavior>
  <!--Sample behavior for a fireplace - attach the back to the wall and
display affinity to the floor, collide against all->
    <Collision host-type='ALL'/>
    <Attachment host-type='Wall' host-location='CENTER'
subject-location='BACK'/>
    <Attach host-type='Floor' host-location='TOP' subject-
location='BOTTOM'/>
</Behavior>
```

Such XML semantically defined behaviors provide that the back of the fireplace may attach to the center of a wall while the bottom of the fireplace attaches to the top of the floor. Further, the fireplace may collide with all types of objects.

As can be seen, a user has the capability to semantically define various behaviors and characteristics for an object with respect to other objects in an easy, understandable, and efficient manner. Such semantic definitions may be created and assigned to new or existing objects dynamically in real time and provides flexibility for determining how parts interact with each other both geometrically and procedurally. Further, additional semantic properties can be added to any definition or modified dynamically after a behavior has been defined. Such characteristics allows the semantics to drive an inheritance type properties and the behavioral properties and attributes of objects.

The semantically defined behaviors can further provide a procedural system where the user/designer can designate an order or procedure for building an item/applying the rules. For example, the procedural aspects/constraints may require a user to place brackets on a wall before a shelf is placed onto the brackets. Prior art techniques would not prevent users from placing a shelf on the wall from the beginning regardless of the structure necessary to support such a shelf.

In addition to the above, the semantics may define specific relationships between objects. For example, a "placed-on" type of relationship may specify that a particular shelf may only be used for photographs or that photographs/photo frame objects may only be placed on a particular shelf.

Software Adaptability

Given a potentially substantial number of users for web-based applications and subsequently large number of designs to be created, one or more embodiments of the invention may utilize adaptable or self-learning capabilities for the system based on identified behavior patterns and styles. While this adaptable or "acquired" behavior may not override the basic rules described above, the system may "suggest" solutions, based on similar designs, styles and other metrics of statistical significance. In this regard, the adaptable system may take advantage of the large number of users and utilize their collective knowledge to present individual consumers with solutions he or she is unlikely to find on their own.

Logical Flow

Figure 3:
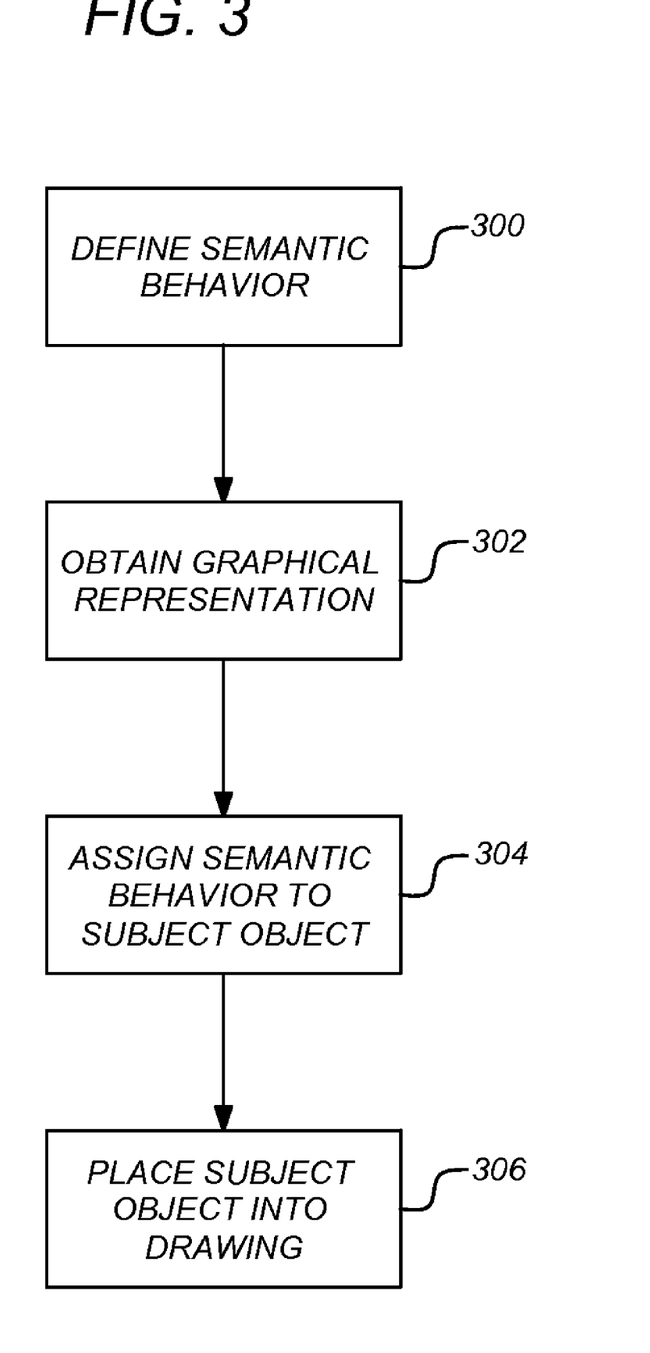
FIG. 3 is a flow chart illustrating the logical flow for manipulating a graphical representation of a real-world object in a computer drawing application in accordance with one or more embodiments of the invention

FIG. 3 is a flow chart illustrating the logical flow for manipulating a graphical representation of a real-world object in a computer drawing application in accordance with one or more embodiments of the invention.

At step 300, a semantic behavior is defined for the real-world object. In this regard, the real-world object may represent any type of object including objects used in a home remodeling/interior design application (e.g., items in FIG. 2, refrigerator, chair, desk, picture, wall, etc). The semantic behavior may be defined using the resource description framework (RDF) language and semantic web.

Further, as described above, the semantic behavior may consist of various rules including a collision rule, orientation rule, affinity/placement rule, attachment rule, etc. Such rules may further have different procedural priorities. Such procedural priorities define the procedural order in which the rules are to be applied and determine which rules have priority (e.g., hierarchically). For example, the procedural priority from highest priority to lowest priority may be collision, attachment, affinity, and orientation. Such a procedural priority may also be viewed as the designation by the semantic behavior of a procedural order for placing the subject object with respect to a host object in a drawing.

In addition to the above, the semantic behavior may be dynamically defined and dynamically assigned to the subject object after the subject object has been created. Thus, new rules or existing rules may be modified and then assigned to an already created/existing object in drawing. Such dynamic rule creation and assigning allows behavioral attributes and properties to be created by the user at any time in a flexible and non-constraining manner. Thus, while certain behavioral properties and attributes can be created before an object is created (and therefore the object essentially inherits certain behavioral traits), additional behaviors can be created and defined dynamically and further constrain a subject objects' placement behavior with respect to other host objects.

Further, the semantic behavior may be defined based on behavior patterns and/or styles that have been identified through usage of the subject object (e.g., with respect to a host object) by one or more multiple users in drawings on a single application or across the Internet (e.g., via a web based application).

At step 302, a graphical representation of a real world object (referred to as a subject object) is obtained. Thus, a geometric or graphical representation of a real-world object (i.e., that is to be used/placed into a drawing) is obtained. Such a method step may include the user creating a geometric object/shape, or the user may retrieve an existing object from a set of objects created by a third party.

At step 304, the semantic behavior is assigned to the subject object. Such a step may be integrated into steps 300 and 302 using a semantic language such that the semantic behavior is created and assigned using XML, RDF, or semantic web.

At step 306, the subject object is placed into a drawing. When placed, the subject object automatically, without additional user input, places itself into the drawing based on the semantic behavior. Accordingly, when placed, the object may reorient itself based on an orientation rule, attach to another object in the drawing (e.g., if placed within a certain proximity of a host object) based on an attachment rule, collide with or avoid collision with a host object based on a collision rule, or be placed in a certain area depending on an affinity rule.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide a semantically based behavioral system for defining and placing objects and their relationships. Embodiments conserve time and resources and reduce the manual work associated with placing objects in an "intelligent" environment. Embodiments of the invention may be utilized in home remodeling and interior design applications, and/or any similar environment, such as landscaping, urban planning, commercial real state planning, etc.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for manipulating a graphical representation of a real-world object in a computer drawing application comprising:
   (a) defining, using a computer, a semantic behavior for the real-world object, wherein:
      (i) the semantic behavior comprises a collision rule, an orientation rule, an affinity rule, and an attachment rule;
      (ii) the collision rule defines an intersection between geometries or bounding boxes of a subject object and a host object;
      (iii) the orientation rule defines an alignment of the subject object with a geometry of the host object;
      (iv) the affinity rule defines placement rules that determine where the subject object can be legally placed in a drawing;
      (v) the attachment rule defines an attachment between the subject object and the host object wherein both the subject object and the host object move if either the host object or subject object is moved;
      (vi) the affinity rule has procedural priority over the orientation rule;
      (vii) the attachment rule has procedural priority over the affinity rule and the orientation rule; and
      (viii) the collision rule has procedural priority over the attachment rule, the affinity rule, and the orientation rule;
   (b) obtaining, using a computer, a graphical representation of the real-world object, wherein the graphical representation is referred to as the subject object;
   (c) assigning, using a computer, the semantic behavior to the subject object, wherein:
      (i) the semantic behavior defines a behavioral rule for placement of the subject object into the drawing;
      (ii) the behavioral rule specifies a host object type that specifies a type of object that the behavioral rule applies to;

(iii) the behavioral rule specifies an exclusion host identifier that identifies a particular host object for which an application of the behavioral rule will be excluded; and (d) placing, using a computer, the subject object into the drawing using the computer-drawing application, wherein the subject object automatically, without additional user input, places itself into the drawing based on the semantic behavior.

2. The method of claim 1, wherein the semantic behavior is defined using Resource Description Framework (RDF) and semantic web.

3. The method of claim 1, wherein the semantic behavior comprises a collision rule that defines an intersection between geometries or bounding boxes of the subject object and a host object.

4. The method of claim 1, wherein the semantic behavior comprises an orientation rule that defines an alignment of the subject object with a geometry of a host object.

5. The method of claim 1, wherein the semantic behavior comprises an affinity that defines placement rules that determine where the subject object can be legally placed in the drawing.

6. The method of claim 1, wherein the semantic behavior comprises an attachment between the subject object and a host object wherein both the subject object and host object move if either the host object or subject object is moved.

7. The method of claim 1, wherein the semantic behavior designates a procedural order for placing the subject object with respect to a host object.

8. The method of claim 1, wherein the semantic behavior is dynamically defined and dynamically assigned to the subject object after the subject object has been created.

9. The method of claim 1, further comprising:
identifying behavior patterns and styles based on usage of the subject object; and
utilizing the behavior patterns and styles to define the semantic behavior.

10. An apparatus for manipulating a graphical representation of a real-world object in a computer drawing application in a computer system comprising:
(a) a computer having a memory;
(b) a computer drawing application executing on the computer, wherein the computer drawing application is configured to
(i) define a semantic behavior for the real-world object, wherein:
(1) the semantic behavior comprises a collision rule, an orientation rule, an affinity rule, and an attachment rule;
(2) the collision rule defines an intersection between geometries or bounding boxes of a subject object and a host object;
(3) the orientation rule defines an alignment of the subject object with a geometry of the host object;
(4) the affinity rule defines placement rules that determine where the subject object can be legally placed in a drawing;
(5) the attachment rule defines an attachment between the subject object and the host object wherein both the subject object and the host object move if either the host object or subject object is moved;
(6) the affinity rule has procedural priority over the orientation rule;

(7) the attachment rule has procedural priority over the affinity rule and the orientation rule; and
(8) the collision rule has procedural priority over the attachment rule, the affinity rule, and the orientation rule;
(ii) obtain a graphical representation of the real-world object, wherein the graphical representation is referred to as the subject object;
(iii) assign the semantic behavior to the subject object, wherein:
(1) the semantic behavior defines a behavioral rule for placement of the subject object into the drawing;
(2) the behavioral rule specifies a host object type that specifies a type of object that the behavioral rule applies to; and
(3) the behavioral rule specifies an exclusion host identifier that identifies a particular host object for which an application of the behavioral rule will be excluded; and
(iv) place the subject object into a drawing, wherein the subject object automatically, without additional user input, places itself into the drawing based on the semantic behavior.

11. The apparatus of claim 10, wherein the semantic behavior is defined using Resource Description Framework (RDF) and semantic web.

12. The apparatus of claim 10, wherein the semantic behavior comprises a collision rule that defines an intersection between geometries or bounding boxes of the subject object and a host object.

13. The apparatus of claim 10, wherein the semantic behavior comprises an orientation rule that defines an alignment of the subject object with a geometry of a host object.

14. The apparatus of claim 10, wherein the semantic behavior comprises an affinity that defines placement rules that determine where the subject object can be legally placed in the drawing.

15. The apparatus of claim 10, wherein the semantic behavior comprises an attachment between the subject object and a host object wherein both the subject object and host object move if either the host object or subject object is moved.

16. The apparatus of claim 10, wherein the semantic behavior designates a procedural order for placing the subject object with respect to a host object.

17. The apparatus of claim 10, wherein the semantic behavior is dynamically defined and dynamically assigned to the subject object after the subject object has been created.

18. The apparatus of claim 10, wherein the computer drawing application is further configured to:
identify behavior patterns and styles based on usage of the subject object; and
utilize the behavior patterns and styles to define the semantic behavior.

19. The method of claim 4, wherein the orientation rule further specifies an execution distance at which an orientation behavior is triggered between the subject object and the host object.

20. The apparatus of claim 10, wherein the orientation rule further specifies an execution distance at which an orientation behavior is triggered between the subject object and the host object.

* * * * *